FIRE INHIBITOR AND EXTINGUISHER

Original Filed July 27, 1956 2 Sheets-Sheet 1

INVENTOR.
Dawson Powell

FIRE INHIBITOR AND EXTINGUISHER

Original Filed July 27, 1956 2 Sheets-Sheet 2

INVENTOR.
Dawson Powell

United States Patent Office

Re. 26,020
Reissued May 10, 1966

26,020

FIRE INHIBITOR AND EXTINGUISHER

Dawson Powell, 1102 Buttonwood Ave., Warwick, R.I.

Original No. 3,019,843, dated Feb. 6, 1962, Ser. No. 600,542, July 27, 1956. Application for reissue Jan. 26, 1965, Ser. No. 444,883
35 Claims. (Cl. 169—2)

Matter enclosed in heavy brackets [ ] appears in the original patent but forms no part of this reissue specification; matter printed in italics indicates the additions made by reissue.

The present invention relates generally to fire prevention and extinguishment, and has particular reference to fire control in connection with [tank storage of flammable liquids and compressed flammable gases which are stored as liquids.] *combustion in enclosed or enclosable spaces, either vented or not vented. The molecular basis for the operation of the invention appears at greater length in an article appearing in the magazine "Safety Maintenance and Production," August 1955, at page 56, entitled "The Mechanics of Fire."*

A [primary] *specific* object of my invention is the provision of *methods and* means for preventing, *controlling* and/or extenguishing fires, such as are likely to be fed by vapors escaping from storage tanks for volatile petroleum liquids, oils, and LPG (liquefied petroleum gas) maintained in the liquid state by conditions of pressure and temperature.

[Another object of the instant invention is the provision of means of the above described character which will be equally as effective with both horizontal- and vertical-type storage tanks, and which, in connection with the latter, may be utilized whether the tank has a closed or open top.]

*The broad objective of my invention is to prevent fire, or, if flame does occur, to control or extinguish flame by substituting fire-inhibited fuel and/or fire-inhibited oxidizers for the fuel and oxidizers available in a fire or potential fire situation, as feed for the flames.*

*Inhibited oxidizers and inhibited fuels are oxidizers and fuels which have been thoroughly mixed to the molecular lever with proportions of inhibiting agents which make the oxidizers and fuels non-ignitable as ingredients of resulting mixtures of which they form the oxidizing and fuel components.*

Another object of my invention is the provision of fire prevention and extinguishing means which may effectively be used wherever flammable liquids or gases are [stored] *enclosed,* some illustrative applications being household-size LPG storage tanks, small and large industrial-size LPG storage tanks, including so-called portable tanks, railroad LPG tank cars and other flammable liquid railroad tank cars, truck delivery tanks for animal, vegetable and mineral oils and LPG, oil-filled transformers, quench and dip tanks, and fuel tanks in [airplane wings] *aircraft and any nearby spaces.*

Another object of my invention is the prevention of flamming of *mixtures of air and* the vapors of fuel *escaping or* dumped from [airplanes while in flight] *aircraft.*

A further object is the provision of fire prevention and extinguishing means wherein the very input heat which is necessary to initiate and sustain the fire [is] *may be* the actuating or triggering means for rendering operative the prevention and extinguishing means *in addition to commercially available means.*

Still another object of the instant invention is the provision of fire prevention, *control* and extinguishing means which are practical and economically feasible to utilize in [connection with] a wide variety of [applications]

*spaces,* but which, nevertheless, are highly efficient in operation.

Objects, features and advantages of the invention will become apparent as the description thereof proceeds when considered in connection with the acompanying [illustrative] *schematic* drawings *and functional factors discussed in "The Mechanics of Fire" above referred to.*

In the drawings which illustrate the best modes presently contemplated by me for carrying out my invention:

Figure 1:
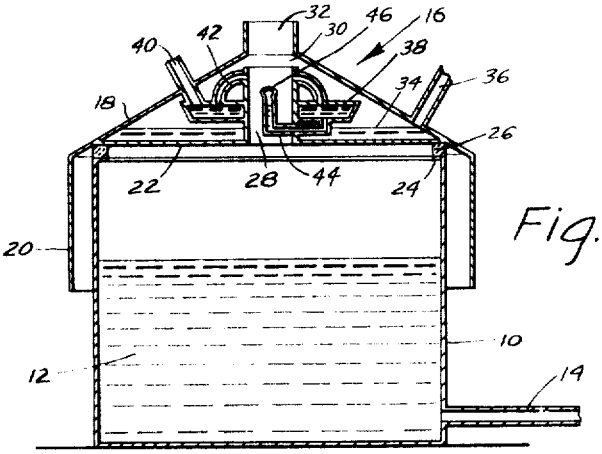
FIG. 1 is a sectional view of a vertical, closed top [, storage] tank embodying my invention.

Heretofore it has generally been taught that three factors are involved in the initiation and continuation of fire whenever a solid [or], liquid *or gas* is the source of the flammable gas or vapor. Basically, these factors are heat, fuel, and oxygen. It is well known that fire can be prevented by the elimination of one of these factors, and that once started, fire can likewise by extinguished by the elimination of one of these factors. In accordance with with the instant invention, however, it is contended that there are actually *at least* six observable or measurable factors involved in the life cycle of a fire and that elimination *or a sufficient decrease* of any of these six factors will serve to effectively prevent[ion] initiation *of, provide control of* and/or *prevent* continuation of the fire. These six factors are:

(1) Input-heat;
(2) Fuel (a vapor or gas);
(3) [Oxygen (from air)] *An oxidizer (usually oxygen from air);*
(4) Proportioning;
(5) Mixing [(for near-burning or remote-burning)]; (a critical factor)
(6) Ignition continuity (*usually by feedback*)

*Input heat is used for overcoming cohesive forces between molecules, accelerating molecules to promote mixing and raising their speeds to velocities at which interatomic bonds are broken by collisions with other molecules.*

With the above factors in mind, it has been found desirable to control the initiation, spread and termination of fire by providing means for intercepting the input-heat before it reaches the flammable vapor or gas source whereby to prevent vaporization of the latter, without which flame is incapable of initiation. Furthermore, it is the basic concept of my invention to cause *proportioned* non-flammable *vapors* [vapor] *or gases* to mix with any flammable vapor that may result from only partial interception of the input heat, said mixture taking place before said vapors [come in contact] *or gases mix* with the [surrounding] *oxidizing* atmosphere or before the occurrence of ignition and to provide, where desirable, intercepting means which in itself is triggered by the input heat it absorbs to convert a non-flammable vaporizing [liquid] *material* into its non-flammable vapors [to] *or* to cause the release of non-flammable liquids, vapors or gases stored under *activating* pressure. As will be obvious, combustion will be prevented when the proportions of the resulting mixture contain a sufficiently high percentage of non-flammable components. While I prefer *in some fire control and hazard situation* to [dilute] *inhibit* the flammable *fuel* vapors, it will be understood that flame can be just as well prevented by [diluting] *inhibiting* the oxygen supply with non-flammable gas or vapor before mixture thereof with the flammable *fuel* vapors *or gases, or before reaching ignition temperature.*

*Understanding the functional operation of my methods is probably simplified by following the functional operations of input heat in their usual sequences, through the initiation, intensification, spread, and extinguishment of flaming combustion. Input heat supplied to solids may produce two different results, that is, the solid may transform into a liquid or it may sublime directly into its vapors or gases. Both of these changes of state require a source of input heat energy which is adequate as to quantity and temperature. Solids which transform into liquids require a second transformation into their vapor or gas phases before their molecules, as individual particles, become freely moving units useful as feed for flame. Summarizing these steps, or the single subliming step, input heat is required to overcome the cohesive forces holding molecules together in their solid or liquid states before they can move freely in three dimensional space where collisions at high molecular velocities will result in combustion when fuel and oxidizing molecules collide with each other.*

*Fuel and oxidizing molecules which exist naturally in their gas or vapor phases require only high temperature input heat sufficient to accelerate them to ignition velocities to prepare them for flaming combustion. As their temperatures are raised, the bonds holding their individual atoms in their molecular configurations may be pictured as loosening and stretching to an extent at which collision of an oxidizing with a fuel molecule frees the atoms of each, permitting them to form new bonding attachments in transient, free-radical or relatively stable end-product molecular configurations.*

*Following this natural sequence further, when the freed atoms of the oxidizing and fuel molecules form new bonding attachments, as free radicals or end-products, the new configurations stabilize at lower energy levels than existed in their oxidizing and fuel configurations. This makes available as heat energy the difference between their old and their new energy levels. The latent and other input-heat required to be fed into the process to carry it to completion thus becomes again available, plus the heat made available by the differences in energy levels between the oxidizing and fuel molecules entering the flame plasma and the energy levels of the end-products when they have cooled down to relative stability.*

*What becomes of this total available heat, whether it is fed back to transform solids and liquids into their gases or vapors and to accelerate gases and vapors to ignition velocities, determines the continuity of the flaming combustion, its intensification and spread or its termination.*

*Preventing feedback, which must be sufficient in both quantity and temperature, breaks the continuity of ignition, ending the process.*

*Dissipation of the available heat by radiation and by intermolecular collisions, to excessive inflowing "inert" or non-energy-contributing molecules, entering the flame plasma often lowers the temperature of the inflowing feed to below ignition requirements, thus producing extinguishment. Excess, above optimum, feed of non-energy-contributing molecules to the flame plasma in less than extinguishing proportions is useful in reducing, limiting and controlling the intensity of the flame by intentional dissipation of available heat energy. This inherent functioning of the natural combustion process is one of the important mechanisms modified and controlled for the successful application of my methods.*

*A second mechanism, illustrated by the use of inhibiting molecules in combination with diluting molecules, as well as separately, in the schematic illustrations of applications of my methods which follow, involves the use of freely moving molecules in their gaseous states which are mixed with fuel and/or oxidizing molecules, some before and some after reaching flame temperatures, to prevent the exothermic release of part or all of the available energy. Typical examples of such inhibiting molecules are the "Freons," which combine more weakly bonded halogens with fluorocarbons, and the halogenated hydrocarbons. Some "Freons" have the additional advantage of being non-toxic or having very low toxicity at ordinary temperatures, in fire controlling proportions.*

*A third mechanism, eexmplified in the schematic illustrations, employs finely divided liquid particles of compounds with high vapor pressures, released in the feeds to flame, where they cool the feeds by drawing from the surrounding atmosphere the heat required for their vaporization, in addition to their other inhibiting or diluting effects.*

*A fourth mechanism, inherent in the example represented by FIGURE 1, employs input heat to accelerate the vaporization of fuel material, thereby increasing the proportion of fuel molecules in the protected space until the resulting atmosphere is too-rich-to-burn, by increasing the fuel-molecule with fuel-molecule collision possibilities and decreasing the oxidizing molecule with fuel molecule collision proportions, as discussed in "The Mechanics of Fire" and tabulated there in Table 1.*

*Natural laws and naturally occurring mechanisms have established the fact that the exothermic reactions in combustion are initiated by and result from intermolecular collisions, as illustrated and discussed in "The Mechanics of Fire." Methods which fail to fulfill nature's requirements for freely moving molecules, in their gaseous phases, proportioning and mixing and the inherent functions of fed back heat energy have proven wasteful of fire control and extinguishing materials, with the ever present chances of failure from lack of consideration of one or more of these factors. Discovery and use of these factors is believed to account for the high efficiency in use of inhibiting materials in my methods and to distinguish them from all others, separately and in their combinations.*

*Diffusion flames, the most common variety, feed fuel molecules from the inside. Oxidizing molecules are fed from the surrounding atmosphere. Common examples include the candle, match, gas jet and most Class A materials. Extinguishment of such flames is instantaneous when they are surrounded and enclosed by an atmosphere containing only inhibited oxidizing molecules. Injecting such an atmosphere into a protected space displaces and replaces an equal volume of uninhibited atmosphere along with any fuel molecules it may contain.*

*Past and present practice is to displace and replace the surrounding atmosphere with the liquid or vapors of pure inhibiting agents, whereas when using "Freon 13B1" over 400 times the effective displacing and replacing volume is made available by my method comprising the steps of vaporizing the liquid, thereby increasing the volume over 13 times, then mixing only 3% of this vapor volume with 97% of air to produce over 429 times the volume of the liquid, of an inhibiting atmosphere for displacing and replacing uninhibited air which is feeding oxidizer to the flame. Extinguishment is equally fast. The cost of inhibiting atmosphere is 1/33 that of pure inhibiting vapor and less than 1/400 that of using the liquid, which is, like its vapor, heavier than air and tends to flow to the lowest available space and out of the combustion zone of the flame, being thus wasted.*

*Air, containing 79% diluent nitrogen and inhibited as described above, substituted for uninhibited air being fed into a pre-mixture, of fuel gases or vapors and air is equally effective in extinguishing flame and results in the same savings, or greater savings, because of the smaller*

*volume required than when fed with fuel from the inside of the flame. Breaking ignition continuity for a few thousandths of a second, by interrupting feed-back, extinguishes flame, in the absence of secondary re-ignition sources.*

*Water, converted to water vapor by atomizing it in the presesnce of fed-back heat undergoes an expansion in volume to around 1,650 times its volume as a liquid. This expanded volume, used to displace and replace an oxidizing atmosphere enclosing and feeding oxygen to diffusion flame from the air-side, dilutes any traces of remaining oxygen, cools, by absorbing released heat, and thus breaks the continuity of ignition, by producing a temperature inadequacy in the heat feed-back, and an oxidizer deficiency simultaneously. Being lighter than air, it rises out of the flame zone; condenses, shrinking in volume when chilled. Being lighter than air, its mixtures are also lighter, whereas mixtures with many inhibiting agents are usually heavier.*

Referring now to the drawings, and more particularly to FIG. 1 thereof, there is shown a conventional [metallic storage] tank 10 having therein a supply of flammable liquid 12 such as gasoline, kerosene, or the like. Any desirable means, such as duct 14, may be provided for replenishing or removing the supply 12 from the tank 10. At the open upper end of tank 10 there is provided a combination cover and interceptor, constructed in accordance with the instant invention, and generally designated at 16.

The cover 16 is preferably constructed of any highly heat conductive [metallic] material and comprises a [substantially conical] roof 18 having a downwardly depending peripheral skirt 20 in spaced relation to the wall of tank 10. Cover 16 further comprises a bottom partition or wall 22 which seats on the upper edge of tank 10, it being understood that the latter may be provided with a marginal flange 24 in order to provide a sufficient base surface for receiving said cover 16. Preferably, a heat insulating layer 26 is interposed between partition 22 and flange 24.

[Centrally disposed in] *In* partition 22 and communicating with the interior of tank 10 is a passageway or channel 28 which extends upwardly toward roof 16 but terminates in spaced relation thereto whereby to define an open [area] *space* 30 which functions as a mixing chamber. As will be noted, the passageway 28 is in alignment with an outlet 32 carried by roof 16, [and centrally disposed with respect thereto]. Surrounding passageway 28 is a lower reservoir 34 defined by partition 22 and roof 16, said reservoir having an inlet 36 extending through roof 16 in order to facilitate replenishment thereof *or initiation of discharge*. Located above reservoir 34 is a second reservoir or compartment 38, said compartment being enclosed and having an inlet 40, ducts 42 communicating with passageway 28, and a conduit 44 leading to a spray nozzle 46 located within said passageway. Preferably, a cover 16 is painted [black] *with a heat absorbent paint* whereby to establish maximum radiant heat absorption characteristics.

*Input heat functions within the spaces shown in FIGURE 1 to transform diluting inhibiting agents contained in reservoir 34, and nonflammable vaporizing inhibiting agents contained in reservoir 38, into their gases or vapors having accelerated velocities, or by causing the release of nonflammable vaporizing inhibiting gases or vapors stored under activating and/or liquefying pressure. Freely moving, diluting molecules are generally lighter than either fuel molecules or other nonflammable inhibiting molecules. Thus, when the input heat is from radiant heat of the sun, for example, the diluting molecules, being lighter, tend to mix with and be vented from the physical enclosure along with the lighter fuel molecules, whereas the other nonflammable inhibiting molecules, being heavier, tend to sink into the fuel vapor space below and become mixed with the heavier fuel molecules, which should they tend to rise would set up a counterflow causing a thorough mixing. A rapid rise of temperature, accompanying exposure to fire, would of course release additional volumes of both diluting and other nonflammable inhibiting mobile molecules to mix with the effluent fuel vapors, in fire inhibiting proportions.*

*Both diluting and other nonflammable inhibiting molecules, mixing with fuel molecules, venting from the fuel vapor space, can be expected to be at lower temperatures than the ignition temperature of the fuel molecules, thus lowering the temperature of the resulting mixture and increasing the mass to be heated, consequently requiring a greater quantity and higher temperature in the input heat to raise the mixture to ignition temperature. If water vapor molecules, for example, are the diluting inhibiting agents their temperature cannot be higher than 212° F. whereas ignition temperatures may range from a few degrees to several hundred degrees higher. The range between the temperature of mixtures flowing out of the mixing space, their mass and the ignition temperature of such mixtures thus represent a range of control of the possibility of flame initiation, even if the effluent is not completely inhibited to the point where it cannot burn when further mixed with an oxidizing atmosphere. Burning will not occur unless input heat from an ignition source is sufficient in quantity and high enough in temperature to raise the resulting mixtures to ignition temperature. Thus a high degree of protection against flaming is provided through lowering effluent temperature combined with proportioning of the inhibiting agents below completely inhibiting proportions. Increasing volumes of effluent could thus enclose an ignition source, absorbing the available input heat from the source faster than input heat is available, without raising the mixtures to ignition temperature, resulting in extinguishment of the ignition source, especially if it is a flame.*

*Nonflammable vaporizing inhibiting molecules included in the effluent mixture directly control the release of energy by collisions between fuel and oxidizing molecules by reducing or preventing such release; and the degree of control can be varied by varying the proportions injected into the mixture before ignition or into the flame plasma before rearrangement of the disassociated atoms of the entering molecules is completed within the plasma. Diluting molecules exert control similarly by absorbing available energy, participation in the make-up of free-radical rearrangements and the ultimate stable endproducts of combustion, but are generally less effective in preventing energy release, probably because of weaker linkages in their original and rearranged bonds. Control of burning rates and temperatures and quantities of heat available for feed-back is exerted by varying the proportions entering the flame plasma. The fineness of control possible is determined by the number of individual diluting and nonflammable molecules fed into the plasma and the uniformity of their distribution by mixing.*

*By selection of nonflammable vaporizing inhibiting molecules of higher vapor pressure than the fuel materials involved they can be prevented from condensing with the fuel molecules when cooling occurs, thus forming an inhibiting layer enclosing the fuel liquid or solid between heating and reheating cycles. Thus an instantly available supply of inhibiting molecules is available for mixing with fuel molecules vaporized by the next reheating which occurs. This mode of operation provides fire prevention during periods when fuel vaporization stops for lack of heat and a degree of control of combustion when fuel vaporization occurs again.*

In operation and use, the reservoirs 34 and 38 are each filled with a vaporizing, non-flammable [liquid] *material*, and preferably, reservoir 34 is filled with water, while compartment 38 is filled with [carbon tetrachloride or the like] *a halogen substituted hydrocarbon or fluorinated, halogenated compound*. Actually, the specific [liquids] *inhibiting agents* utilized are not critical so long as they are vaporizing and non-flammable, in extinguishing proportions and accordingly, such liquids as monobromomonochlorodifluoromethane, methyl bromide, dibromodifluoromethane, dibromotrifluorethane, bromochloromethane, as well as liquids of the "Freon" class, can be used, if desired. At any rate, no matter what [liquids] *inhibiting agents* be utilized, it will be understood that as radiant input heat is directed toward tank 10, it will be intercepted by cover 16 and its depending skirt 20. *The area of this cover exposed to this input heat will determine the heat absorbed and the selected area may be chosen with respect to the results desired.* Since the cover 16 is highly heat absorbent, as heretofore described, and since said cover makes contact with tank 10 only through the medium of heat insulating layer 26, it becomes apparent that the transfer of the input heat to the tank 10 proper is substantially minimized. [In the meantime] *At the same time,* the application of heat to the cover 16 causes vaporization of the non-flammable [liquids] *materials* contained in the reservoirs 34 and 38 *in proportion to the heat absorbed or the area of the cover exposed to the input heat.* As will be obvious, the non-flammable vapors from reservoir 34 will pass upwardly to mixing chamber 30 and thence outwardly through outlet 32, while the vapors from compartment 38 will pass through ducts 42 to passageway 28 [and then upwardly and outwardly through said outlet 32] *but being a heavier-than-air non-flammable inhibiting vapor or gas it will inherently tend to flow downward into the vapor space above the flammable material 12, its freely moving molecules mixing with the flammable molecules, oxidizing molecules and gaseous diluting molecules from air contained therein, thus first inhibiting the oxidizing molecules present and as more heavy nonflammable inhibiting molecules flow into the vapor space gradually inhibiting the fuel molecules of the fuel vapors normally present in such spaces during a heating cycle.* Since the only outlet for whatever vaporization that does take place of the flammable [liquid] *material* in [tank] *protected space* 10 is through passageway 28, it becomes obvious that said flammable vapors are thoroughly mixed [in the mixing chamber 30] *as their individual freely moving molecules move in counterflow against heavier-than-air inhibiting molecules tending to flow downward through passageway 28 and further inhibited by diluting water vapor, lighter-than-air molecules, in the mixing space 30* with a sufficient proportion of non-flammable *inhibiting plus diluent inhibiting* vapors to render the total effluent mixture non-flammable before said mixture comes in contact with the surrounding atmosphere and oxygen and a source of ignition. Thus it will be seen that I have provided an entirely self-contained unit which intercepts [the] radiant heat energy before it comes in contact with the flammable [liquid] *material* and which further employs said heat for [vaporizing a non-flammable liquid. The non-flammable vapors in turn are caused] *converting nonflammable and diluently inhibiting material into their vapor or gas forms with their freely moving molecules having sufficient kinetic energy to turbulently* mix with whatever flammable vapors do occur, before said mixture comes in contact with the surrounding atmosphere.

*Oxygen contained in air entering the protected vapor space above the flammable material 12, in replacement of material removed therefrom during a heating cycle, is further diluted by passing in counterflow through lighter-than-air water vapor molecules passing outwardly through outlet 32, when moving slowly. If the inflow of air through outlet 32, is rapid the oxygen in the air is further dilluted by and intermingled with confluent water vapor molecules at temperatures below the ignition temperature of the gaseous flammable material within the protected vapor space whose vaporized molecules have been previously inhibited by pre-mixing with heavier than air non-flammable molecules from reservoir 38. The entering oxygen itself is further inhibited by additional inhibiting molecules flowing confluently with it into the protected vapor space. Replacement air entering through outlet 32 during cooling cycles can only mix with inhibited fuel vapor molecules within the protected vapor space to form non-explosive mixtures and may be further inhibited by the release of nonflammable inhibiting molecules from a pressurized gaseous supply held adjacent the protected space and entering through replacement inlets 36 or 40, in proportions required by the rate of inward flow of replacement air. This would be a normal protective procedure during rapid or complete removal of flammable material 12 from protected space 10.*

When a liquid such as "Freon" is used in compartment 38 wherein temperature rise causes rapid pressurization of same, I prefer to take advantage of this fact by wetting down, so to speak, the flammable vapors as they pass through passageway 28. Thus I have provided a conduit 44 for connecting compartment 38 with spray nozzle 46, the latter being located within the passageway 28, whereby as the temperature rises and the "Freon" in substantially enclosed compartment 38 becomes highly pressurized, non-flammable liquid spray will be forced into said nozzle and will spray therefrom, mixing with the effluent flammable liquid, vapors or gases. At the same time, the non-flammable vapors from the "Freon" will pass through *metering* ducts 42 into passageway 28, as aforedescribed.

*The majority of fires exemplify the release of fuel gases or vapors with in an enclosing atmosphere which contains and supplies the oxidizing molecules required to form flammable mixtures capable of burning. Fuel gases and vapors diffuse into the enclosing atmosphere and the atmosphere diffuses into the fuel. In the application of my method of substituting fire inhibited oxidizer for uninhibited oxidizer the available volume for forming an enclosing inhibited atmosphere is of major importance. The more effective nonflammable inhibiting agents are usually expensive, concentrated and available as liquids. My method includes steps not usually applied in using these agents. The solids, in some cases, or liquids are first converted to their gaseous forms. Preferably as gases or vapors they are proportioned into and distributed evenly in the oxidizing atmosphere, with rather astonishing increases in the resulting effective volume. The volume of "Freon 13B1" for example increases over 13 times in conversion from the liquid state to the vapor state. Proportioning and distributing the vapor molecules in air by thorough mixing further increases the effective volume 33⅓ times, when using a 3% concentration by volume, producing over 400 times the liquid volume for use as an inhibited atmosphere for enclosing diffusion flame on the oxygen side. Such a proportioned premixture is breathable and at the same time extinguishes flame.*

*When water is converted into water vapor its volume increases over 1,600 times. The vapor is useful, when added to the nitrogen forming about 79% of air, in preventing, controlling and extinguishing fire when it is applied as an enclosing inhibited atmosphere, for dilution and for absorption of released heat energy to prevent its feedback. This mode of operation is believed to be a new contribution to the art, as are: inhibited fuel vapors which are then used to replace with gaseous fuel containing atmospheres in proportions which prevent, control or extinguish combustion.*

*The specific functional action of inhibiting agents can be roughly divided into two classes. The first class acts by dilution and includes such agents as nitrogen, carbon dioxide, water vapor, helium and the other rare inert gases. Their presence in an otherwise flammable mixture serves to decrease the possibilities of oxidizer-fuel molecular collisions and also by immediately absorbing heat energy released in the combustion, thereby reducing both the amount and the temperature of the heat energy available for feedback to raise the temperature of in-flowing fuel and oxidizers as described in the above said "The Mechanics of Fire."*

*The second class acts by altering the sequences of*

*and the atomic combinations appearing in the free radicals resulting from the initial combustion collisions between fuel and oxidizing molecules. In many cases this results in a decrease in the release of energy available from the combustion. The end-products of the combustion are changed, and it is believed that the sequences involved in reaching fairly stable end-products is shortened. The details of the process involved in such inhibition with nonflammable molecules are still under study and accepted theories and explanations are not yet available. The second class includes such agents as halogen compounds.*

*Wherever air, containing approximately 79% nitrogen, is a part of the flammable mixture, prevention of combustion or extinguishment of combustion involves the additive function of dilution to increase the effectiveness of any nonflammable agent or agents being used. Thus, when Freon 13B1 is used to form a premixture of fire-inhibited air and is fed to the air side of the flames, 1% to 3% of $CF_3Br$ produces extinguishment, whereas when oxygen-enriched air and $CF_3Br$ are fed from the air side to the flame, higher proportions of $CF_3Br$ are required to compensate for the deficiency in nitrogen and to produce extinguishment. The functional contribution of nitrogen and other gases making no contribution to the available heat release is at least twofold. The presence of the nitrogen molecules decreases the number of collisions between energy contributing oxygen and fuel molecules and increases collisions with the energy absorbing nitrogen molecules, thus reducing the temperatures. This simultaneously reduces the velocities of such collisions as do occur.*

*The functional action of dilution is, as diagrammed and discussed in "The Mechanics of Fire," to reduce a a mixture of flammable proportions toward a mixture which is too-lean-to-burn. When this functional action is combined with nonflammable disruption of the combustion process, important savings in the quantity of nonflammable inhibitor required are gained. It is possible to prevent, control and/or extinguish combustion using either method alone. The greater benefits are gained by using them incombination.*

Figure 2:
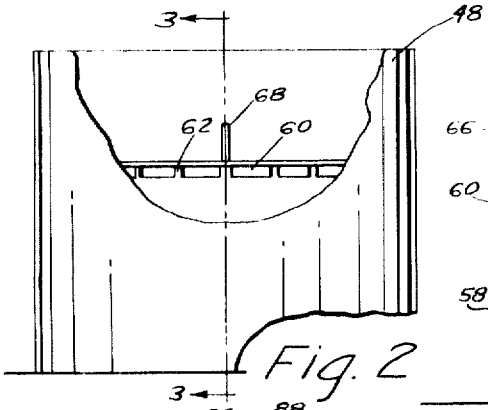
FIG. 2 is an elevational view of an open top, vertical [storage] tank embodying a slightly modified form of my invention, portions broken away for purposes of illustration.
Figure 3:
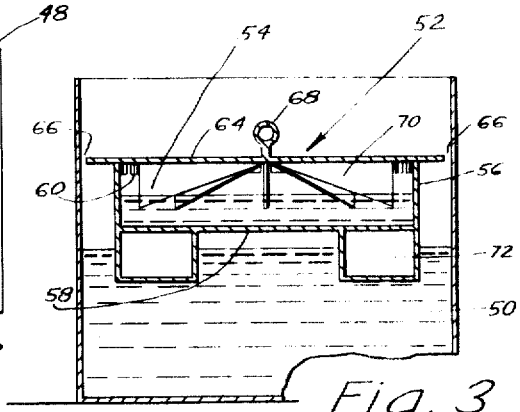
FIG. 3 is a section taken on line 3—3 of FIG. 2.

Referring now to FIGS. 2 and 3, a slightly different application and construction of the instant invention is illustrated. More specifically, there is shown an open-top [storage tank] *enclosure* 48 having therein a supply of flammable liquid 50. A floating inhibitor generally designated at 52 is positioned on the upper surface of the liquid 50 and comprises a reservoir 54 having a continuous side wall 56 and a bottom wall 58. As will be seen most clearly in FIG. 2, the uppermost portion of side wall 56 is provided with a plurality of spaced openings 60 defining therebetween upwardly extending struts 62 on which is mounted a top wall 64 of slightly smaller peripheral dimension than tank 48 whereby to define an open [area] *space* or mixing chamber 66 therebetween. The upper surface of top wall 64 is preferably black whereby to impart thereto maximum heat absorbing characteristics, and centrally secured thereto is a lifting ring 68. The under surface of wall 64 is provided with a plurality of radial, downwardly depending heat conductive fins 70. A plurality of flotation chambers 72 are secured to the lower surface of bottom wall 58 whereby the inhibitor 52 may be crane lifted into place within the tank 48 and will be floatingly received therein.

In operation, this form of my invention is quite similar to that described in connection with FIG. 1. More specifically, any desirable vaporizing non-flammable [liquid] *inhibiting agent* is placed within the reservoir 54, whereby upon application of input heat to the unit, non-flammable vapors will flow outwardly through openings 60 and upwardly through mixing chamber 66. Since the flammable vapors from the liquid 50 also must pass through the space 66, said flammable vapors will be [diluted] *inhibited* by the non-flammable vapors before coming in contact with the surrounding atmosphere and oxygen. The [dilution] *inhibition* of the flammable vapors is such that the mixture is no longer flammable even when it is further mixed with air in the presence of a source of ignition.

Here again, the construction is such that much of the input radiant energy will be intercepted and absorbed by the inhibitor. Hence, the exposed top of the latter is preferably black, and the heat conductive fins 70 will function to cause quick transfer of the heat to the vaporizing, non-flammable [liquid] *material* whereby to insure rapid vaporization of the latter. As will be obvious, my inhibitor 52 is, in effect, portable and may rapidly be positioned within any open tank should a fire develop. In addition to its fire extinguishing function, it will be understood that, if desired, the inhibitor 52 could also be permanently positioned within a tank in order to function as fire preventative means and vapor conserver.

Figure 4:
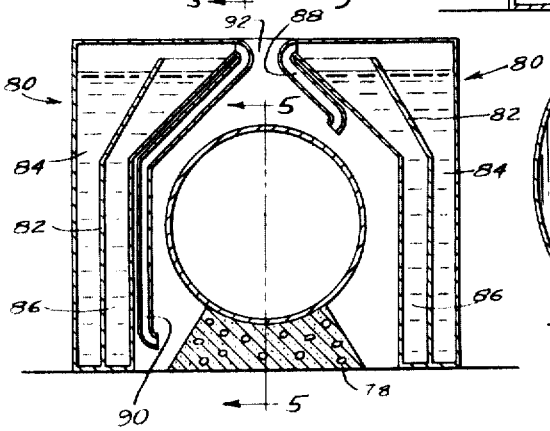
FIG. 4 is a sectional view of a horizontal [storage] tank embodying the instant invention.
Figure 5:
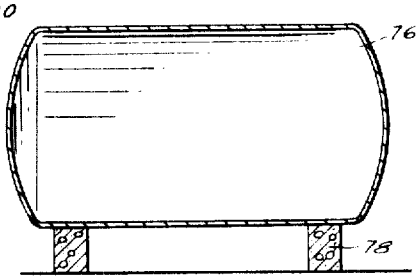
FIG. 5 is a section taken on line 5—5 of FIG. 4.

FIGS. 4 and 5 illustrate my invention as applied to horizontal [storage] tanks, and in this embodiment the basic principle is to automatically envelope the tank with a non-flammable vapor [responsive to a sufficient application of input heat]. Thus, the tank 76 is mounted on a pair of spaced concrete pedestals 78 and is positioned between a pair of substantially identical, longitudinally extending enclosures generally designated at 80. Each of the enclosures 80 is provided with a longitudinally extending partition 82 defining a pair of separate, open-top compartments 84 and 86. A plurality of ducts 88 extend from one of the enclosures and terminate adjacent the upper portion of tank 76, while a plurality of somewhat longer ducts 90 extend from the opposite enclosure and terminate adjacent the lower portion of said tank.

Briefly summarizing the operation of this form of my invention, the compartments 84 and 86 are filled with any vaporizing, non-flammable [liquids] *inhibiting agents*, although I prefer to use water in the outer compartments 84. As will be obvious, the enclosures 80 will serve to intercept input heat directed toward the tank 76, and at the same time the application of heat to the enclosures will vaporize the [liquids] *materials* in the compartments 84 and 86, causing non-flammable vapor to flow through ducts 88 and 90 and substantially envelope the tank 76 whereupon any flammable vapor that may emanate from the latter will be rendered non-flammable before coming into contact with the surrounding air. In this respect, it will be noted that the enclosures 80 are designed to provide a relatively restricted passage 92 above the tank 76 whereby to better insure proper mixing of the non-flammable and flammable vapors or gases before they come in contact with the oxygen of the surrounding air.

While each of the aforedescribed illustrations of my invention works on the principle of [diluting] inhibiting the hydrocarbon before it comes in contact with the air, whereby the mixture will be non-flammable, it will be understood that the opposite approach can be utilized, if desired, with substantially the same results. More specifically, if the air or oxygen is sufficiently [diluted] inhibited before mixing with the [hydrocarbon] fuel *vapors*, flaming will be prevented. This specific approach is particularly adaptable in connection with aircraft fire prevention and extinguishment and may be readily applied to fuel-tank sections of airplane wings, engine sections, jet power pod sections, *passenger and crew spaces, baggage compartments and* any similar spaces, etc. Since [the necessary] radiant-heat absorbing areas can be built of very thin, light metal, the inclusion of my invention will add very little weight to an airplane wing structure, and, if desired, the web structures of the wings can be used to simultaneously serve the double function of providing strength for the wings and at the same time acting as containers for the non-flammable vaporizing [liquid] *material*. Reservoirs, with connecting piping of small tubing, can be located in the main fuselage of the plane for replenishment *and pressurization* of the [non-flammable vaporizing liquid] *inhibiting agent or agents* either by gravity or pressure feed.

Figure 6:
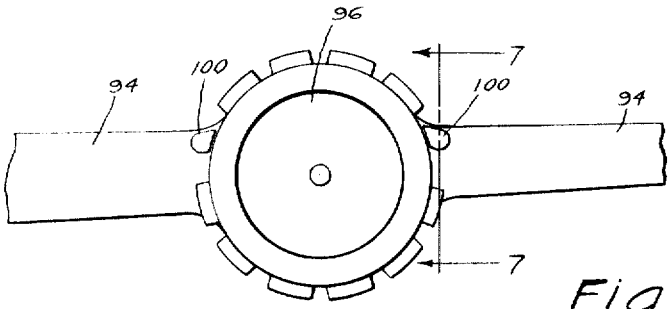
FIG. 6 is a fragmentary front elevation of an airplane wing and engine embodying my invention.
Figure 7:
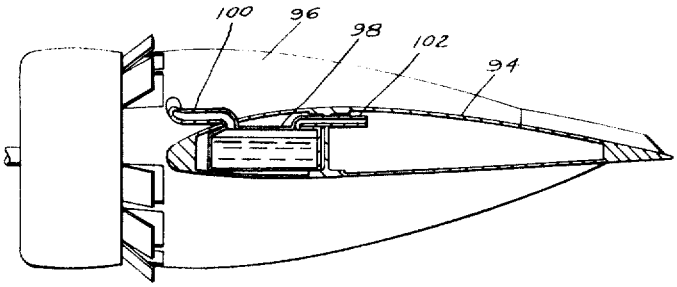
FIG. 7 is a section taken on line 7—7 of FIG. 6.
Figure 8:
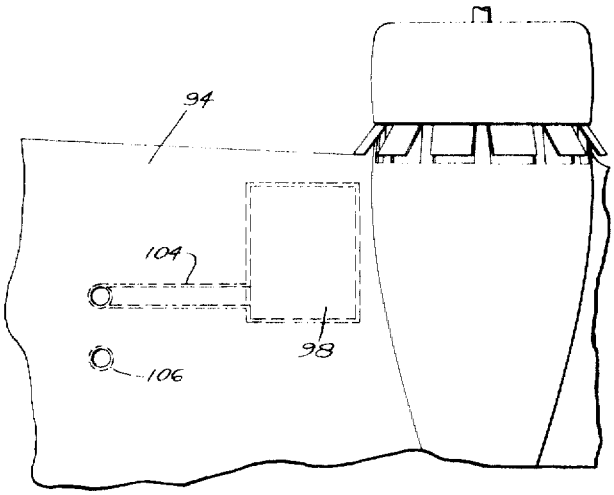
FIG. 8 is a fragmentary bottom view of an airplane wing showing schematically an additional feature of the instant invention.

Referring now to FIGS. 6 through 8, an illustrative embodiment of this form of my invention, as applied to aircraft usage, is shown. An airplane wing 94 having an engine 96 has provided within its web structure a lightweight metal container or reservoir 98. Preferably, a pair of these containers or reservoirs are provided for each engine, and are located adjacent to and on opposite sides thereof. Conduit or tube 100 extends from each reservoir 98 and is directed toward the space surrounding the engine whereby when the reservoirs are filled with a vaporozing, non-flammable [liquid] *fluid,* radiant heat from hostile fire around the engine 96 will cause vaporization of said [liquid] *fluid,* and the non-flammable vapors *from the vapor space at the top* will flow through conduit 100 and *thoroughly* mix with the oxygen in the atmosphere surrounding the engine. This [dilution] *inhibition* of the oxygen renders the surrounding atmosphere non-flammable whereby hostile fire is *extinguished, part of the throughflowing air is displaced and replaced by the inflowing vapor molecules and fire is* prevented from spreading within the power pod [or] wing structure *or other protected spaces.*

In order to further [inert] *inhibit* the atmosphere within the wing structure, a second conduit 102 discharges non-flammable vapors from reservoir 98 to the interior of the wing space, *through an aspirating mixing chamber (not shown but functioning like the mixing space in FIG. 1) which draws in, proportionally inhibits and pre-mixes non-flammable vapor with the atmosphere within the wing voids and re-discharges the inhibited mixture within the wing voids thereby minimizing the build-up of pressure and the volume of atmosphere which must be vented by the displacing and replacing volume of the in-flowing inhibiting vapor molecules.* This is important since the engine fuel tanks are usually located within the wing structure and are normally subject to input heat from a hostile engine fire capable of vaporizing the contents of said fuel tank and thereby creating a serious fire hazard. By [inerting] *inhibiting* the [area] *space* surrounding these fuel tanks, near exposure to the radiant heat from flame is prevented.

In connection with this form of my invention just described, an additional tube or conduit 104 may be provided to carry vaporizing, non-flammable [liquid] *fluid* from the *bottom of the* container or reservoir 98 to a point adjacent the outlet 106, through which fuel is dumped while the aircraft is in flight. More specifically, *if,* for any one of a number of reasons, it may become necessary or desirable to jettison the fuel supply of an aircraft in flight, [and] it will be understood that the high-speed air stream into which the fuel is dumped will cause atomization of the liquid, resulting in the formation of flammable [vapors] *mixtures.* Should the aircraft engine exhaust ever inadvertently come into contact with these flammable [vapors] *mixtures,* an explosion could conceivably occur with disastrous results. Accordingly, I prefer to render the jettisoned fuel non-flammable by causing it to mix with a *required* proportion of vaporizing, non-flammable [liquid] *inhibiting agent* prior to being introduced into the air stream. This can be most simply accomplished by causing vaporizing non-flammable liquid to flow from reservoir 98 through conduit 104 by gravity or pressure means (not shown) to a point adjacent and preferably ahead of fuel outlet 106. The fuel opening and the opening from the proportioning conduit or tube may be closed by a remote control common cover (not shown) which closes and opens both of them simultaneously, or the closure of the tube may be opened thermostatically by the interception and absorption of radiant heat energy or by other means. When both ports are open, the effect will be to cause the non-flammable vaporizing liquid flowing from reservoir 98 to mingle with and flow confluently with the fuel from the aircraft's fuel tanks, resulting in both being atomized simultaneously in the high-speed air stream passing the outlets. The effect of such simultaneous atomization and vaporization of non-flammable vaporizing liquid and flammable vaporizing liquid will be the formation of a mixture of non-flammable and flammable components in proportions which are non-flammable in total when further mixed with the surrounding air, even in the presence of a source of ignition.

While there [is] *are* shown and described herein certain specific structure*s* [embodying] *useful in practicing* the invention, it will be manifest to those skilled in the art that various modifications and rearrangements of the *functional* parts may be made without departing from the spirit and scope of the underlying [inventive concept] *method* and that the same is not limited to the particular [forms] *applications* herein shown and described except insofar as indicated by the scope of the appended claims.

I claim:

1. Apparatus for preventing and extinguishing combustion in *an* open-top [storage tanks] *tank* for flammable liquids, said apparatus comprising a floatable compartment of slightly less peripheral dimension than the tank interior, said compartment being substantially enclosed with the exception of a plurality of outlet openings located adjacent the upper portion thereof, said compartment being adapted to receive therein a supply of vaporizing non-flammable [liquid] *material* whereupon application of radiant heat to said tank will simultaneously cause vaporization of the flammable [liquid] *material* therein and the non-flammable [liquid] *material* in said compartment, said vapors mixing to produce a *proportioned* non-flammable mixture before contacting the surrounding air.

2. In the apparatus of claim 1, said compartment having an upstanding side wall and a top wall, said outlet openings being positioned at the upper end of said side wall and said top wall having a plurality of heat conductive fins extending into the compartment interior.

3. A [non-combustible storage tank for flammable liquids and the like] *space containing flammable materials* having a cover portion, an enclosed reservoir within said cover portion, a mixing [area] *space* associated with said cover portion through which vapors and the like emanating from said [tank] *space* must pass before reaching the surrounding atmosphere, and a passageway interconnecting said reservoir and said mixing [area] *space* whereby vapors and the like emanating from said reservoir must also pass through said mixing [area] *space* before reaching the surrounding atmosphere, said cover portion being insulated from said tank and having a skirt depending in spaced relation thereto.

4. Apparatus for presenting and extinguishing combustion in a [storage] container [containing] *of* flammable material, said apparatus comprising a compartment located adjacent to said [storage] container, a supply of vaporizing, non-flammable material in said compartment, means associated with said compartment for intercepting a sufficient proportion of input heat [directed toward said storage container from points outside said container] to cause said non-flammable material to vaporize [at least] as soon as [any] *accelerated* vaporization of said flammable material takes place, and means causing said non-flammable vapors to mix with all said flammable vapors *or gases* prior to mixing with the surrounding air whereby to cause a *resulting proportioned* mixture which is non-ignitable by the temperature attained by the said input heat, said last mentioned means comprising a restricted mixing space through which said flammable and non-flammable vapors *or gases* must *turbulently* pass before reaching the surrounding atmosphere.

5. A [non-combustible storage] container for flammable material and the like, a cover portion for said container defining a restricted mixing space through which flammable vapors from said container are free to pass to mingle with the surrounding air, said cover portion otherwise blocking said flammable vapors whereby it is essential that they pass through said mixing space before reaching the surrounding air, an enclosed reservoir associated with said container, and means interconnecting said reservoir with said mixing space whereby vapors and the like emanating from said reservoir will be forced into said mixing space, said reservoir being associated with said cover portion so that heat absorbed by the latter will be directed to the former to cause vaporization and pressurization of its contents at least as quickly as *accelerated* vaporization of the [stored] *contained* flammable material takes place.

6. A method for preventing and extinguishing flaming combustion fed by fuel vapors or gases from flammable material within an enclosure and resulting from the application of input heat from an ignition source located externally of the inclosure, said method comprising the steps of intercepting and absorbing controlled proportions of the input heat from said ignition source, utilizing said intercepted and absorbed heat to cause the emission of non-flammable vapors or gases from non-flammable material held adjacent said enclosure, and mixing said non-flammable vapors or gases with all of the flammable vapors flowing out from the enclosure or with all the air flowing into the enclosure, prior to the mixing of said flammable vapors and air with each other, with the proportion of non-flammable gases or vapors being such that the resultant mixture of non-flammable and flammable gases or vapors and air is non-ignitable by the temperature attained from the said input heat, thus preventing ignition of the mixture whereby to inhibit spread of the fire to the flammable material within the enclosure.

*7. A method for preventing and extinguishing flaming combustion fed by fuel vapors or gases from flammable material within an enclosure and resulting from the application of input heat from an ignition source located externally of the enclosure, said method comprising the steps of intercepting and absorbing controlled proportions of the input heat from said ignition source, utilizing said intercepted and absorbed heat to cause the emission of non-flammable vapors or gases from non-flammable material held adjacent said enclosure, and mixing said non-flammable vapors or gases with all of the flammable vapors flowing out from the enclosure or with all the air flowing into the enclosure, prior to the mixing of said flammable vapors and air with each other, with the proportion of non-flammable gases or vapors being such that the resultant mixture of non-flammable and flammable gases or vapors and air is non-ignitable by the temperature attained from the said input heat.*

*8. A method for preventing flaming combustion between fuel vapors or gases from flammable material and oxidizing vapors or gases within a protected space, said method comprising the steps of causing emission of non-flammable vapors or gases from a non-flammable substance held in a container adjacent said protected space, and thoroughly mixing said non-flammable vapors or gases within a mixing chamber separate from said protected space with all of the flammable vapors or gases flowing out from the protected space or with all the oxidizing atmosphere flowing into the protected space with the proportion of non-flammable gases or vapors being such that the resultant mixture of non-flammable and flammable gases or vapors and the oxidizing vapors or gases is non-ignitable.*

*9. A method for preventing and extinguishing flaming combustion between fuel vapors or gases from flammable material and oxidizing gases or vapors within a protected space and resulting from the application of input heat, said method comprising the steps of causing the emission of non-flammable vapors or gases from a non-flammable substance held in a container adjacent said protected space, and thoroughly premixing within a separate mixing chamber said non-flammable vapors or gases with all of the flammable vapors or gases flowing out from the protected space or with all the oxidizing atmosphere flowing into the protected space prior to their reaching the protected space, with the proportion of non-flammable gases or vapors being such that the resultant mixture of non-flammable and flammable gases or vapors and the oxidizing gases or vapors is non-ignitable.*

*10. A method for preventing and extinguishing flaming combustion between fuel vapors or gases from flammable material and oxidizing gases or vapors within a protected space, said method comprising the steps of causing the release of pressurized non-flammable vapors or gases from a non-flammable substance held in a container adjacent said protected space, and thoroughly premixing said non-flammable vapors or gases within a separate mixing chamber with all of the flammable vapors or gases flowing out from the protected space or with all the oxidizing atmosphere flowing into the protected space prior to their reaching said protected space, with the proportion of non-flammable gases or vapors being such that the resultant mixture of non-flammable and flammable gases or vapors and the oxidizing gases or vapors is non-ignitable.*

*11. A method for preventing and extinguishing flaming combustion fed by fuel vapors or gases from flammable material within a protected space and resulting from the application of input heat, said method comprising the steps of absorbing controlled proportions of the input heat, utilizing said absorbed heat to cause the emission of non-flammable vapors or gases from non-flammable material held adjacent said protected space, and premixing said non-flammable vapors or gases within a separate mixing chamber with all of the flammable vapors flowing out from the protected space or with all of the oxidizing atmosphere flowing into the protected space and injecting said inhibited oxidizing atmosphere or inhibited fuel vapors into the protected space to displace and replace the atmosphere therein, with the proportion of non-flammable gases or vapors being such that the resultant inflowing or effluent mixture of non-flammable and flammable gases or vapors and oxidizing atmosphere is non-ignitable.*

*12. A method for preventing and extinguishing flaming combustion fed by fuel vapors or gases from flammable material within a protected space, said method comprising the steps of causing the release of pressurized non-flammable vapors or gases from non-flammable material held adjacent said protected space, and premixing said non-flammable vapors or gases within a separate mixing chamber with all of the flammable vapors flowing out from the protected space or with all of the oxidizing atmosphere flowing into the protected space, and injecting said inhibited oxidizing atmosphere or inhibited fuel vapors into the protected space to displace and replace the atmosphere therein, with the proportion of non-flammable gases or vapors being such that the resultant inflowing or effluent mixture of non-flammable and flammable gases or vapors and oxidizing atmosphere is non-ignitable.*

*13. The method for preventing flaming combustion in a mixture of flammable material and an oxidizing material that comprises the steps of introducing into and mixing with one of said materials within separate mixing chamber an inhibiting volatile diluent substance and a second different non-flammable substance, in amounts to render the proportions of the resulting mixture of the materials non-ignitable at temperatures to which said resulting mixture of the materials may be exposed.*

*14. The method of claim 13 wherein the inhibiting volatile substances are mixed throroughly with the flammable material.*

*15. The method of claim 13 wherein the inhibiting volatile substances are mixed thoroughly with the oxidizing material.*

*16. The method for controlling flaming combustion in*

*a mixture of flammable material and an oxidizing material that comprises the steps of introducing into and premixing with one of said materials feeding the flame an inhibiting volatile diluent substance in a separate mixing chamber to decrease or prevent the release of available energy and a second different nonflammable substance, in amounts to render the proportions of the resulting mixture of the materials less flammable at temperatures to which said resulting mixture of the materials may be exposed.*

*17. The method of claim 16 wherein the inhibiting gas, vapors or volatile substance is mixed thoroughly with the flammable material.*

*18. The method of claim 16 wherein the inhibiting gas, vapors or volatile substance is mixed thoroughly with the oxidizing material.*

*19. The method for extinguishing flaming combustion in a mixture of flammable material and an oxidizing material that comprises the steps of introducing into and mixing with one of said materials feeding the flames an inhibiting volatile diluent substance and a different nonflammable substance, in amounts to render the proportions of the resulting mixture of the materials nonignitable at temperatures to which said resulting mixture of the materials may be exposed.*

*20. The method of claim 19 wherein the inhibiting gas or volatile substance is mixed thoroughly with the flammable material.*

*21. The method of claim 19 wherein the inhibiting gas or volatile substance is mixed thoroughly with the oxidizing material.*

*22. The method for preventing or extinguishing combustion in a mixture of flammable material and an oxidizing material that comprises the steps of providing a volatile inhibiting substance, premixing in a separate mixing chamber said substance with said material in a predetermined proportion, expanding the volume of the mixture by drawing thermal energy from the flammable or oxidizing material feeding the mixture during the proportioned premixing to cool the mixture while gaining any available volume increase from adding together the specific volumes of the inhibiting substance and the material, using the combined expanded and cooled volume of premixture of inhibiting substance and material to displace and replace all uninhibited gases material in a space separate from said chamber for prevention or extinguishment, the said proportion of inhibiting substance in the expanded and cooled premixtures being large enough to cause the final resultant mixture to be non-ignitable.*

*23. The method of claim 22 wherein the inhibiting substance is premixed with the flammable material.*

*24. The method of claim 22 wherein the inhibiting substance is premixed with the oxidizing material.*

*25. The method for controlling combustion in a flaming mixture of flammable material and an oxidizing material that comprises the steps of providing a volatile inhibiting substance, premixing said substance with said material in a predetermined proportion, expanding the volume of the mixture by drawing thermal energy from the flammable or oxidizing material feeding the flame during the proportioned premixing to cool the feed to the flame while gaining any available volume increase from adding together the specific volumes of the inhibiting substance and the material, using the combined expanded and cooled volume of premixture of inhibiting substance and material to displace and replace a part or all of their corresponding uninhibited flammable or oxidizing feeds to the flame with the proportions of the inhibiting substance in the premixture being variable but less than extinguishing in the final resultant mixture of flammable, oxidizing and inhibiting substances and materials feeding the flame for control of burning.*

*26. The method of claim 25 wherein the inhibiting substance is premixed with the flammable material.*

*27. The method of claim 25 wherein the inhibiting substance is premixed with the oxidizing material.*

*28. The method of reducing or preventing feedback of input heat for ignition continuity from flame being continuously fed fuel and oxidizing molecules in the proportions required to maintain ignition temperatures in the flame plasma comprising the steps of premixing within a mixing chamber separated from the flame in proportioned amounts with either the fuel or oxidizing molecules feeding the flame, nonflammable vaporizing molecules in a gaseous state of a character which provide no release of available energy in the flame plasma and substituting these premixtures outside of said chamber for their corresponding feeds to the flame to absorb and dissipate released energy thereby lowering the energy level of the input heat from the flame.*

*29. The method of claim 28 wherein the nonflammable vaporizing molecules are diluting molecules.*

*30. The method of claim 28 wherein the nonflammable vaporizing molecules are halogenated molecules.*

*31. The method of claim 28 wherein the nonflammable vaporizing molecules are both diluting molecules and halogenated molecules.*

*32. The method of claim 28 wherein the nonflammable vaporizing molecules are Freon molecules.*

*33. The method of claim 28 wherein the separate premixing comprises the steps of expanding the nonflammable vaporizing molecules during the premixing step with either the fuel or oxidizing molecules available as feed to the flame so as to draw the heat of expanson of the inhibiting molcules from the fuel or oxidizing molecules with which they are mixed to produce a low temperature in the substituted feed to the flame.*

*34. The method of rendering vaporizing fluid fuel material nonflammable upon being introduced into a stream of oxidizing atmosphere comprising the steps of causing a vaporizing nonflammable substance to mingle with and flow confluently with the vaporizing fuel material being introduced into the stream of oxidizing atmosphere, simultaneously atomizing the vaporizing nonflammable substance and the flammable vaporizing fuel material in the stream of oxidizing atmosphere to form mixtures of nonflammable and flammable components, said nonflammable substance being present in a proportion which will render nonflammable the total mixture when further mixed with the surrounding oxidizing atmosphere.*

*35. The method of preventing controlling and extinguishing flaming combustion between vapors and gases from flammable material and oxidizing gases or vapors which comprises providing two different vaporizing nonflammable inhibiting substances held in separate compartments, gasifying said two substances, mixing said two gasified substances and causing said two mixed inhibiting substances to be mixed with either the fuel or oxidizing material in the proportions required to prevent, control or extinguish flaming combustion.*

References Cited by the Examiner

The following references, cited by the Examiner, are of record in the patented file of this patent or the original patent.

UNITED STATES PATENTS

| | | | |
|---|---|---|---|
| 234,291 | 11/1880 | King. | |
| 239,431 | 3/1881 | Birge. | |
| 1,386,232 | 8/1921 | Bole. | |
| 1,394,060 | 10/1921 | Bates. | |
| 1,775,846 | 9/1938 | Blaw. | |
| 2,248,308 | 7/1941 | Rice. | |
| 2,558,694 | 6/1951 | Speig. | |
| 2,706,005 | 4/1955 | Zingler | 169—4 |
| 2,706,527 | 4/1955 | Guljas et al. | 169—4 |
| 2,757,744 | 8/1956 | Malone | 169—4 |

EVERETT W. KIRBY, *Primary Examiner.*